United States Patent [19]

Priddy

[11] Patent Number: 4,806,599
[45] Date of Patent: Feb. 21, 1989

[54] POLYOLEFIN/POLYCARBONATE/-POLYOLEFIN TRIBLOCK COPOLYMERS

[75] Inventor: Duane B. Priddy, Midland, Mich.

[73] Assignee: The Dow Chemical Company, Midland, Mich.

[21] Appl. No.: 135,207

[22] Filed: Dec. 21, 1987

[51] Int. Cl.$^4$ ............................................. C08L 69/00
[52] U.S. Cl. ...................................... 525/146; 525/468
[58] Field of Search ............. 525/146, 468, 344, 359.3

[56] References Cited

U.S. PATENT DOCUMENTS

| | | | |
|---|---|---|---|
| 3,080,342 | 3/1963 | Lee et al. | 260/47 |
| 3,461,187 | 8/1969 | Cantrill | 260/873 |
| 3,462,515 | 8/1969 | Cantrill | 260/873 |
| 3,875,256 | 4/1975 | White | 260/860 |
| 3,991,009 | 11/1976 | Margotte et al. | 260/42.18 |
| 4,146,587 | 3/1979 | Beck et al. | 260/873 |
| 4,217,437 | 8/1980 | Schreckenberg et al. | 528/171 |
| 4,319,003 | 3/1982 | Gardlund | 525/148 |
| 4,436,839 | 3/1984 | Behnke et al. | 521/64 |
| 4,657,977 | 4/1987 | Peters | 525/92 |

Primary Examiner—Theodore E. Pertilla
Attorney, Agent, or Firm—Price, Heneveld, Cooper, DeWitt & Litton

[57] ABSTRACT

New polymeric compositions comprising polyolefin-polycarbonate-polyolefin triblock copolymers and a method of preparation comprising reacting a monohydroxy polyolefin in an organic solvent with a carbonate precursor such as phosgene, adding the resultant mixture to bisphenol A, water, an organic solvent and an acid acceptor such as sodium hydroxide, controlling the pH of the polymerizing mixture at 11 and, after the polymerization is complete, decreasing the pH to 8 and recovering the product.

17 Claims, No Drawings

POLYOLEFIN/POLYCARBONATE/POLYOLEFIN TRIBLOCK COPOLYMERS

BACKGROUND OF THE INVENTION

This invention relates to ABA triblock copolymers wherein the A segments are polyolefin and the B segments are polycarbonate.

Polycarbonate polymers are well known, commercially available materials having a variety of applications. Such carbonate polymers may be prepared by reacting a polyhydroxy compound, such as 2,2-bis(4-hydroxy phenol)-propane, with a carbonate precursor, such as phosgene, in the presence of an acid binding agent. Generally speaking, the polycarbonate resins have excellent physical properties, including tensile and impact strength, heat resistance and dimensional stability, are usable over wide temperature limits and have good creep resistance. However, the polycarbonates are expensive, difficult to process from a melt because of high viscosities at temperatures slightly above the melting point and exhibit severe environmental stress grazing and cracking.

In general, polycarbonates are incompatible with other polymers, particularly polymers derived from ethylenically unsaturated monomers, thereby inhibiting the use of other polymeric materials in order to modify polycarbonate compositions or to use polycarbonates as modifiers for other polymer compositions.

SUMMARY OF THE INVENTION

In accordance with the present invention, there are provided new polymeric compositions comprising polyolefin-polycarbonate-polyolefin ABA type triblock copolymers prepared by reacting a monohydroxyl terminated polyolefin with a carbonate precursor and subsequently with bisphenol A. The triblock copolymers of the invention improve the properties of polycarbonate-polyolefin blends.

DESCRIPTION OF THE PREFERRED EMBODIMENTS

In the preferred embodiment, each A segment of the triblock copolymers comprises a polyolefin having a molecular weight in the range from 300 to 50,000 and the B segment comprises a polycarbonate having a molecular weight in the range of 5,000 to 30,000. The polycarbonate segment can be formed from a single polyhydroxy compound, such as polyethylene glycol or bis(4-hydroxy phenyl) propane or a mixture of two or more such polyhydroxy compounds. In the latter case, it is preferable that one of the mixture of polyhydroxy compounds is bis(4-hydroxy phenyl) propane.

In the ABA type block copolymers of this invention, each of the A units or segments comprise a polyolefin segjoined to the polycarbonate B segments. Thus, it is a characteristic feature of the present invention that the polyolefin contain a single reactive group and that the polycarbonate contain two groups which are reactive with the reactive moiety of the polyolefin. Preferably, the reactive moiety of the polyolefin will be a hydroxy group with the reactive functionality of the polycarbonate being obtained from a carbonate precursor compound such as a diacyl halide, a diisocyanate, a bis(-haloaryl) sulfone, a carbonyl halide or bis-haloformate with carbonyl halides and bis-haloformates, particularly carbonyl halides, being preferred. The polycarbonate is derived from polyhydric alcohols or phenols, particularly dihydric alcohols or phenols, with dihydric phenols being particularly preferred.

In forming the polycarbonate B segment, there can be employed substantially any dihydroxy compounds, including their polymeric forms. Examples include the lower alkylene glycols having from 2 to 8 carbon atoms, the dihydroxy terminated polyoxyalkylene ethers having an average number of repeating units of 2 to 10 and the alkylene groups having from 2 to 8 carbon atoms, dihydric phenols of the benzene series, such as hydroquinone, resorcinol, etc., biphenols of the benzene series, e.g., dihydroxy biphenols, or bisphenols of the benzene series which are either bis(hydroxy phenyl) alkenes wherein the alkene moiety has from 1 to 8 carbon atoms or bis(hydroxy phenyl) oxides or ethers, or the above compounds which contain either a phenylene or biphenylene group wherein from 1 up to the total number of halogens on the aryl rings are replaced by alkyl groups having from 1 to 8 carbon atoms or halogen groups.

Specific examples of dihydric alcohols are alkylene glycols, such as ethylene glycol, 1,2- and 1,3-propane diol, the various isomeric butane diols, the various isomeric hexane diols, including the cyclohexane diols or dihydroxy cyclohexanes, the isomeric octane diols, the poly(oxyalkylene) glycols, such as triethylene glycol, tetraethylene glycol and the like.

Examples of phenols of the benzene series include biphenols, bisphenols and the halo and alkyl substituted derivatives thereof, hydroquinone, resorcinol, catechol, 1,2-dihydroxy-4-chlorobenzene, 1,4-dihydroxy-2chlorobenzene, 1,2-dihydroxy-4-bromobenzene, 2,5-dihydroxy3-chlorotoluene, 2,4'-dihydroxy diphenyl, 3,3',5,5'-tetrachloro-4,4'-dihydroxy diphenyl, 4,4'-dihydroxy diphenyl ether, bis(2-hydroxy phenyl) methane, 1,2-bis(4-hydroxy phenyl) methane and 1,1-bis(4-hydroxy phenyl) propane, 2,6-dihydroxy naphthalene, bis-(4-hydroxy phenyl) sulfone, 2,4-dihydroxy diphenyl sulfone, 5'-chloro-2,4'-dihydroxy diphenyl sulfone, 4,4'-dihydroxy diphenyl ether, 4,4'-dihydroxy-3,3'-dichloro diphenyl ether and 4,4'-dihydroxy-2,5-dihydroxy diphenyl ether. Currently, the preferred dihydroxy compound for use in preparing the B segment polycarbonate is 4,4-bis(hydroxy phenyl)propane, also known as bisphenol A.

The polyolefin A segments are formed from substantially any polymer, copolymer or interpolymer of alkenes having from 2 to 8 carbon atoms with the proviso that such polymers have a single terminal moiety which is reactive with the polycarbonate precursor material, such as a carbonyl halide, bis-haloformate or bis(carbonate ester). Particularly preferred are monohydroxy functional homopolymers and copolymers of ethylene. The monohydroxyfunctional polyolefins can be prepared by the catalyzed polymerization of olefins, such as ethylene, followed by hydrolysis of the aluminum-terminated polymer.

Carbonate precursor compounds suitable for use in making the triblock copolymers of this invention include diacyl halides of both aliphatic and aromatic dicarboxylic acids, diisocyanate, bis(haloaryl) sulfones, carbonyl halides, carbonyl haloformates and carbonate esters. The carbonyl halides which may be employed are carbonyl bromide, carbonyl chloride and mixtures thereof. Typical of the carbonate esters which may be employed are diphenyl carbonate, di-(halophenyl) carbonates such as di-(chloro phenyl) carbonate, di- (bromophenyl) carbonate, di-(trichlorophenyl) carbonate, di-(tribromophenyl) carbonate, etc., di-(alkylphenyl) carbonates such as di-(tolyl) carbonate, etc., di-(naphthyl) carbonate, di-(chloronaphthyl) carbonate, phenyl tolyl carbonate, chlorophenyl chloronaphthyl carbonate, or mixtures thereof. The suitable haloformates which ma be used include bis-haloformates of dihydric phenols and bis-chloroformates of dihydric alcohols such as ethylene glycol, neopentyl glycol, polyethylene glycol and the like. While other carbonate precursors will occur to those skilled in the art, carbonyl chloride, also known as phosgene, is preferred.

The triblock copolymers of this invention can be produced by conventional solution or interfacial processes known in the art for the manufacture of polycarbonates. The solution process involves reacting, for example, the monohydroxy polyolefin and carbonate precursor such as phosgene in an appropriate solvent such as methylene chloride and contacting the phosgenated-polyolefin with the dihydric phenol in the presenc of additional phosgene. The reaction mixture may be a single organic phase employing a compatible solvent such as a halohydrocarbon, e.g., trichloromethane and utilizing a base such as pyridine or triethylamine to accept the by-product hydrogen chloride. Alternatively, interfacial polymerization techniques may be employed wherein the reaction media is composed of an organic phase and an alkaline aqueous phase. A phase transfer catalyst, that is, an acid acceptor such as triethylamine or sodium hydroxide, may be used to accept the by-product hydrogen chloride from the condensation in the organic phase and to transfer the hydrogen chloride to the alkaline aqueous phase where it is neutralized and the catalyst is regenerated to its unprotonated form to accept additional hydrogen chloride.

The solution and interfacial polymerization techniques known in the art for the manufacture of carbonates can be applied equally in the practice of the instant invention, as more fully set forth in the examples.

Any conventional organic solvent that will solvate the product polymer may be used in the process of the instant invention, so long as the solvent is chemically unreactive in the polycarbonate polymerization. A preferred group of solvents is the chlorinated aliphatic hydrocarbons of 1-4 carbons such as dichloromethane, chloroform, carbon tetrachloride, dichloroethane, trichloroethane, trichloroethylene, tritetrachloroethylene and mixtures thereof. Another desirable class of solvents is the optionally halogenated aromatic hydrocarbons such as monochlorobenzene, dichlorobenzene and mixtures thereof. Preferred solvents are the chloromethanes and especially dichloromethanes. The solvents used in a solution polymerization process are preferably water free so as to avoid side reactions.

The interfacial process utilizes an organic phase and an aqueous phase. In carrying out the interfacial process, it is important that the organic solvent chosen be immiscible with water. The quantity of organic solvent and the concentration of the reactants in the solvent are not critical except that sufficient solvent should be present to dissolve the product polymer and the organic carbonate precursors such as phosgene should be present in an amount sufficient to form the polycarbonates of the present invention. An amount of organic solvent sufficient to form a product polymer solution of about 20 weight percent polymer is generally the minimum amount of solvent. The organic phase carbonate precursor such as phosgene generally should be present in stoichiometric amounts with respect to the amount of hydroxyl functionality present in both the monohydroxy polyether and the dihydric phenol.

The aqueous phase is normally basic to the extent of a pH of at leas about 8 and preferably at least about 9 prior to reaction. During reaction, the pH may vary within the range of about 7 to 12, but preferably is kept above 7 by the addition of base such as sodium hydroxide when needed.

The dihydric carbonate forming reactants, in an interfacial polymerization reaction, are provided in the aqueous phase and when neutralized with the base are referred to the organic phase as bisphenolates. These reactants are normally formed by dissolving the bisphenols in water with an inorganic base, such as an alkali or alkaline earth hydroxide, preferably an alkaline metal hydroxide, and most preferably, sodium hydroxide. The concentrations of the bisphenolates in the aqueous phase are not critical except that the aqueous phase bisphenolate should be present in an amount sufficient to form the triblock copolymers of the present invention. The aqueous phase bisphenolates generally should be present in stoicheometric amounts with respect to the phosgenated polyether and the added carbonate precursor such as phosgene. Other materials which do not adversely affect the polymerization reaction may be present in the aqueous phase in addition to the bisphenolates and excess base, such as antioxidants, foam depressants and catalysts.

A suitable acid acceptor may be either an organic or an inorganic acid acceptor. A suitable organic acid acceptor is a tertiary amine and includes such materials as pyridine, triethyl amine, dimethyl aniline, tributyl amine and the like. The inorganic acid acceptor may be a hydroxy, a carbonate, a bicarbonate or a phosphate of an alkali or alkali earth metal, such as sodium hydroxide. A currently preferred acid acceptor is sodium hydroxide.

The carbonate catalysts which are employed herein can be any of the suitable catalysts that aid the polymerization of dihydroxy compounds with carbonate precursors such as phosgene. Suitable catalysts include tertiary amines such as, for example, triethyl amine, tripropyl amine, N,N-methyl aniline, quaternary ammonium compounds such as tetraethylammonium bromide, cetyl triethylammonium bromide, tetra-n-heptaammonium iodide, tetra-n-propylammonium bromide, tetramethylammonium chloride, tetramethylammonium hydroxide, tetra-n-butylammonium iodide, benzyl trimethylammonium chloride and quaternary phosphonium compounds such as n-butyl triphenyl phosphonium bromide and methyl triphenyl phosphonium bromide.

It is, of course, possible to employ two or more different dihydric phenols or a copolymer of a dihydric phenol with a glycol or with hydroxy or acid terminated polyester, or with a dibasic acid to provide a carbonate copolymer or interpolymer as the B segment of the triblock copolymers of this invention. Also employed in the practice of this invention may be blends of any of the above materials to provide the carbonate polymer segment.

The process for making the polycarbonates, whether by solution polymerization or by interfacial polymerization, may be carried out at ambient temperatures, such as typical room temperature condition, i.e., 23° to 25° C. Higher and lower temperatures may be employed, taking into consideration the problems of stabilizing an interfacial polymerization at temperatures above or below ambient temperatures. The solution process allows the use of a wide temperature range, no particular temperature being absolutely critical to the practice of the process of the invention. Pressure is not critical so superatmospheric or subatmospheric pressures can be used as well as atmospheric pressure. Reaction time can vary from minutes to as long as several hours.

The example which follows is intended solely to illustrate this invention and is not intended in any way to limit the scope and intent of this invention.

EXAMPLE 1

Preparation of Polyethylene-Polycarbonate-Polyethylene ABA Triblock Copolymer Seventy grams of a monohydroxyl terminated polyethylene having an average degree of polymerization of (Henkle Corporation Primarol, 1915) was dissolved in 750 cc of methylene chloride. Twenty-five grams of phosgene was added followed by 2 cc of triethylamine. This solution was added at a rate 20 cc per minute to a 4 liter resin kettle containing 275 grams of bisphenol A, 1500 cc of water, 1500 cc of methlyene chloride and 50 grams sodium hydroxide. During the addition of the polyethylene solution, phosgene was added at a rate of 3 grams per minute. Fifty percent aqueous sodium hydroxide solution was added as required to control the pH of the polymerization mixture at 11. After the polyethylene solution and 125 grams of phosgene had been added, the pH of the mixture was decreased to 8 by the addition of more phosgene. The brine layer was separated and the polymer solution was added to two times its volume of acetone. The polymer which precipitated was removed by filtration. Analysis of the polymer by size exclusion chromatography showed it to have a weight average molecular weight of 15670 and a number average molecular weight of 6779. DSC analysis showed the polymer to have a lower glass transition temperature than an unmodified polycarbonate resin of the same molecular weight.

It is understood that the above is merely a preferred embodiment and that various changes and alterations can be made without departing from the spirit and broader aspects of the invention.

The embodiments of the invention in which an exclusive property or privilege is claimed are defined as follows:

1. A triblock copolymer of the ABA type wherein the A segments comprise polyolefins and the B segments comprise polycarbonates.

2. A triblock copolymer in accordance with claim 1 wherein said polyolefin comprises polyethylene.

3. A triblock copolymer in accordance with claim 1 wherein said polycarbonate is derived from at least one dihydroxy compound comprising bis(4-hydroxyphenyl) propane.

4. A triblock copolymer in accordance with claim 3 wherein said polyolefin comprises polyethylene.

5. A triblock copolymer in accordance with claim 1 wherein said polyolefin has a molecular weight in the range from 300 to 50,000 and said polycarbonate has a molecular weight in the range from 5,000 to 30,000.

6. A triblock copolymer in accordance with claim 5 wherein said polyolefin comprises polyethylene.

7. A triblock copolymer in accordance with claim 5 wherein said polycarbonate is derived from at least one dihydroxy compound comprising bis(4-hydroxyphenyl) propane.

8. A triblock copolymer in accordance with claim 1 wherein said polycarbonate comprises a copolycarbonate formed from at least two different polyhydroxy compounds, one of said polyhydroxy compounds being bis-(4-hydroxyphenyl) propane.

9. A triblock copolymer in accordance with claim 8 wherein said polyolefin comprises polyethylene.

10. A triblock copolymer in accordance with claim 8 wherein said polyolefin has a molecular weight in the range from 300 to 50,000 and said polycarbonate has a molecular weight in the range from 5,000 to 30,000.

11. A triblock copolymer in accordance with claim 10 wherein said polyolefin comprises polyethylene.

12. A method for preparing ABA-type triblock copolymers comprising:
(a) contacting at least one monohydroxy polyolefin with at least one carbonate precursor material to form a reaction mixture;
(b) contacting said reaction mixture (a) with at least one dihydroxy compound in the presence of at least one carbonate precursor material and at least one acid acceptor; and
recovering ABA-type polyolefin-polycarbonatepolyolefin triblock copolymer product.

13. A method in accordance with claim 12 wherein said carbonate precursor material comprises carbonyl chloride.

14. A method in accordance with claim 12 wherein said monohydroxy olyolefin comprises monohydroxy polyethylene and said dihydroxy compound comprises bis(4-hydroxyphenyl) propane.

15. A method in accordance with claim 12 wherein said dihydroxy compound comprises a mixture of at least 2 dihydroxy compounds, one of which is bis(4-hydroxyphenyl) propane.

16. A method in accordance with claim 15 wherein said carbonate precursor material comprises carbonyl chloride.

17. A method in accordance with claim 16 wherein said monohydroxy polyolefin comprises monohydroxy polyethylene.

* * * * *